(12) United States Patent
Romano et al.

(10) Patent No.: US 10,854,953 B2
(45) Date of Patent: Dec. 1, 2020

(54) ELECTRONIC DEVICES HAVING HOUSING-INTEGRATED ANTENNAS

(71) Applicant: Apple Inc., Cupertino, CA (US)

(72) Inventors: Pietro Romano, Foster City, CA (US);
Umar Azad, Santa Clara, CA (US);
Harish Rajagopalan, San Jose, CA (US);
David Garrido Lopez, Campbell, CA (US);
Lu Zhang, Shanghai (CN);
Rodney A. Gomez Angulo, Santa Clara, CA (US);
Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 445 days.

(21) Appl. No.: 15/717,821

(22) Filed: Sep. 27, 2017

(65) Prior Publication Data

US 2019/0097306 A1    Mar. 28, 2019

(51) Int. Cl.
*H01Q 1/24* (2006.01)
*H01Q 13/10* (2006.01)
*H01Q 1/52* (2006.01)
*H04B 1/3827* (2015.01)
*H01Q 21/06* (2006.01)
(Continued)

(52) U.S. Cl.
CPC ............... *H01Q 1/243* (2013.01); *H01Q 1/52* (2013.01); *H01Q 13/10* (2013.01); *H01Q 21/064* (2013.01); *H01Q 21/28* (2013.01); *H04B 1/3827* (2013.01); *H04M 1/026* (2013.01); *H04M 1/0262* (2013.01); *H04M 1/0266* (2013.01)

(58) Field of Classification Search
CPC combination set(s) only.
See application file for complete search history.

(56) References Cited

U.S. PATENT DOCUMENTS 9,178,268 B2    11/2015    Zhu et al.
9,318,793 B2    4/2016    Zhu et al.
(Continued)

OTHER PUBLICATIONS

Hsu et al., "Compact Multiband Antenna for Handsets with a Conducting Edge" IEEE Transactions of Antennas and Propagation, vol. 63, No. 11, Nov. 2015, 6 pages.
(Continued)

*Primary Examiner* — Graham P Smith
*Assistant Examiner* — Jae K Kim
(74) *Attorney, Agent, or Firm* — Treyz Law Group, P.C.; Michael H. Lyons; Matthew R. Williams

(57) ABSTRACT

An electronic device may include a peripheral conductive housing sidewall with an integral ledge extending towards the device interior. A display cover layer may be supported by the integral ledge. A slot antenna may be formed from a slot in the integral ledge. The integral ledge may be mounted to a surface of a substrate and coupled to a conductive rear housing wall by a conductive layer extending over an additional surface of the substrate. The sidewall may include a vertical portion extending from the ledge to the rear wall. The slot antenna may be fed via near-field coupling using a conductive patch that is located within the slot at the surface of the substrate. The conductive layer, rear housing wall, and vertical portion may form a cavity for the slot antenna. The conductive layer may isolate the slot from interference with a battery, display circuitry, or other components.

18 Claims, 7 Drawing Sheets

(51) Int. Cl.
*H04M 1/02* (2006.01)
*H01Q 21/28* (2006.01)

(56) References Cited

U.S. PATENT DOCUMENTS

| | | |
|---|---|---|
| 2008/0198082 A1* | 8/2008 | Soler Castany ....... H01Q 13/10 |
| | | 343/770 |
| 2012/0194393 A1* | 8/2012 | Uttermann ............... H01Q 1/52 |
| | | 343/702 |
| 2012/0235881 A1 | 9/2012 | Pan et al. |
| 2012/0262344 A1* | 10/2012 | Tsai ..................... H01Q 1/2266 |
| | | 343/702 |
| 2013/0082895 A1 | 4/2013 | Shiu et al. |
| 2013/0147664 A1 | 6/2013 | Lin |
| 2013/0194150 A1* | 8/2013 | Korva ..................... H01Q 1/48 |
| | | 343/848 |
| 2013/0293424 A1* | 11/2013 | Zhu ........................ H01Q 1/243 |
| | | 343/702 |
| 2014/0282059 A1* | 9/2014 | Oh ........................ G06F 1/3265 |
| | | 715/744 |
| 2015/0295314 A1 | 10/2015 | Oh |
| 2016/0013543 A1 | 1/2016 | Nguyen |
| 2016/0072178 A1* | 3/2016 | Khalifa .................... H01Q 1/36 |
| | | 343/702 |
| 2016/0087329 A1 | 3/2016 | Rappoport et al. |
| 2016/0259366 A1 | 9/2016 | Kenny et al. |
| 2017/0215290 A1 | 7/2017 | Bathiche et al. |
| 2017/0251086 A1 | 8/2017 | Gagne-Keats et al. |

OTHER PUBLICATIONS

Harish Rajagopalan et al., U.S. Appl. No. 15/275,192, filed Sep. 23, 2016.

* cited by examiner

ELECTRONIC DEVICES HAVING HOUSING-INTEGRATED ANTENNAS

BACKGROUND

This relates to electronic devices, and more particularly, to antennas for electronic devices with wireless communications circuitry.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with a satisfactory efficiency bandwidth.

It would therefore be desirable to be able to provide improved wireless communications circuitry for wireless electronic devices.

SUMMARY

An electronic device may include a housing having a peripheral conductive sidewall with an integral ledge portion extending towards the interior of the electronic device. A display having a display cover layer may be mounted to and supported by the integral ledge portion. The electronic device may include wireless circuitry having one or more antennas. The antennas may include a slot antenna having a slot radiating element in the integral ledge portion that is configured to convey radio-frequency signals through the display cover layer.

The integral ledge portion (sometimes referred to herein as a ledge or integral ledge) may be mounted to a surface of a dielectric substrate such as an injection-molded plastic substrate. The integral ledge may be coupled to a conductive rear housing wall of the electronic device by a conductive layer that extends between the integral ledge and the conductive rear housing wall over an additional surface of the dielectric substrate. The peripheral conductive sidewall may include a vertical portion that extends from the integral ledge to the conductive rear housing wall. The slot antenna may be indirectly fed using a conductive patch located within the slot element at the surface of the dielectric substrate. A radio-frequency transmission line may be coupled to a positive antenna feed terminal on the conductive patch and a ground antenna feed terminal on a vertical portion of the peripheral conductive sidewall. The conductive patch may excite antenna currents on the integral ledge, conductive layer, rear housing wall, and/or vertical portion of the peripheral conductive sidewall via near-field electromagnetic coupling. The conductive layer, rear housing wall, and vertical portion may form a cavity back for the slot antenna that enhances antenna performance. The conductive layer may electromagnetically isolate the conductive patch and the slot element from interference with a battery, display circuitry, or other device components.

DETAILED DESCRIPTION

Figure 1:
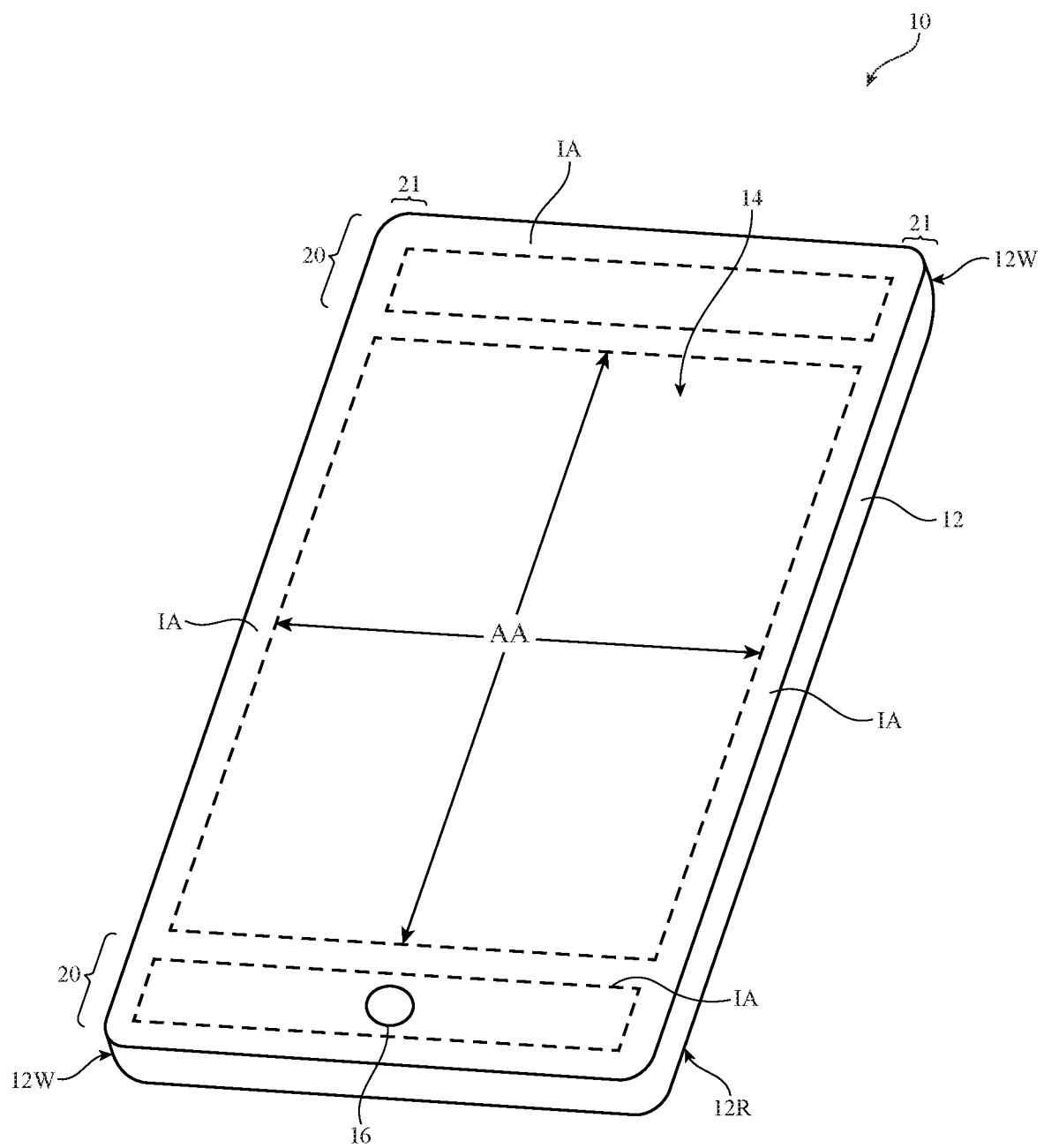
FIG. 1 is a perspective view of an illustrative electronic device in accordance with an embodiment.

An electronic device such as electronic device 10 of FIG. 1 may be provided with wireless circuitry that includes antennas. The antennas may be used to transmit and receive wireless signals.

The wireless circuitry of device 10 may handle one or more communications bands. For example, the wireless circuitry of device 10 may include a Global Position System (GPS) receiver that handles GPS satellite navigation system signals at 1575 MHz or a GLONASS receiver that handles GLONASS signals at 1609 MHz. Device 10 may also contain wireless communications circuitry that operates in communications bands such as cellular telephone bands and wireless circuitry that operates in communications bands such as the 2.4 GHz Bluetooth® band and the 2.4 GHz and 5 GHz WiFi® wireless local area network bands (sometimes referred to as IEEE 802.11 bands or wireless local area network communications bands). Device 10 may also contain wireless communications circuitry for implementing near-field communications at 13.56 MHz or other near-field communications frequencies. If desired, device 10 may include wireless communications circuitry for communicating at 60 GHz, circuitry for supporting light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as wall 12R. Rear housing wall 12R may have slots that pass entirely through the rear housing wall and that therefore separate housing wall portions (rear wall portions and/or sidewall portions) of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic. Housing 12 may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral housing structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding lip or ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

If desired, rear housing wall 12R may be formed from a metal such as stainless steel or aluminum and may sometimes be referred to herein as conductive rear housing wall 12R or conductive rear wall 12R. Conductive rear housing wall 12R may lie in a plane that is parallel to display 14. In configurations for device 10 in which rear housing wall 12R is formed from metal, it may be desirable to form parts of peripheral conductive housing structures 12W as integral portions of the housing structures forming the conductive rear housing wall of housing 12. For example, conductive rear housing wall 12R of device 10 may be formed from a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Conductive rear housing wall 12R may have one or more, two or more, or three or more portions. Peripheral conductive housing structures 12W and/or the conductive rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide structures 12W and/or 12R from view of the user).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may have an active area AA that includes an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as a speaker port or microphone port. Openings may be formed in housing 12 to form communications ports (e.g., an audio jack port, a digital data port, etc.) and/or audio ports for audio components such as a speaker and/or a microphone if desired.

Display 14 may have an inactive border region that runs along one or more of the edges of active area AA. Inactive area IA may be free of pixels for displaying images and may overlap circuitry and other internal device structures in housing 12. To block these structures from view by a user of device 10, the underside of the display cover layer or other layer in display 14 that overlaps inactive area IA may be coated with an opaque masking layer in inactive area IA. The opaque masking layer may have any suitable color. In the example of FIG. 1, inactive areas IA may be located within regions 20 between the upper and lower edges of device 10 and active area AA. Inactive areas IA may also be located within regions 21 between the left and right edges of device 10 and active area AA. In general, larger active areas AA may allow for a larger area for the user of device 10 to interact with device 10. If desired, inactive areas IA within regions 20 and/or 21 may be relatively narrow (e.g., from 0.5 mm to 5.0 mm wide) in order to maximize the size of active area AA. As an example, the inactive area in regions 20 and/or 21 may, for example, overlap with the thickness of peripheral conductive housing structures 12W (e.g., active area AA may extend across substantially all of the face of device 10 except for over the top surfaces of peripheral conductive housing structures 12W or ledge structures defined by peripheral conductive housing structures 12W).

The antennas of the wireless circuitry in device 10 can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures.

Portions of peripheral conductive housing structures 12W may be provided with peripheral gap structures if desired. The gaps in peripheral conductive housing structures 12W may be filled with dielectric such as polymer, ceramic, glass, air, other dielectric materials, or combinations of these materials. Gaps may divide peripheral conductive housing structures 12W into one or more peripheral conductive segments. There may be, for example, two peripheral conductive segments in peripheral conductive housing structures 12W (e.g., in an arrangement with two gaps), three peripheral conductive segments (e.g., in an arrangement with three gaps), four peripheral conductive segments (e.g., in an arrangement with four gaps), etc. The segments of peripheral conductive housing structures 12W that are formed in this way may form parts of antennas in device 10.

If desired, openings in housing 12 such as grooves that extend partway or completely through housing 12 may extend across the width of conductive rear housing wall 12R and may penetrate through conductive rear housing wall 12R to divide the conductive rear housing wall into different portions. These grooves may also extend into peripheral conductive housing structures 12W and may form antenna slots and other structures in device 10. Polymer or other dielectric may fill these grooves and other housing openings. In some situations, housing openings that form antenna slots and other structure may be filled with a dielectric such as air.

Housing 12 may have four peripheral edges (e.g., four peripheral conductive sidewalls 12W) as shown in FIG. 1 and one or more antennas may be located along one or more of these edges. As shown in the illustrative configuration of FIG. 1, antennas may, if desired, be mounted in regions 20 along opposing upper and lower peripheral edges of housing 12 and/or in regions 21 along opposing left and right peripheral edges of housing 12 (as an example). The antennas may include antenna resonating elements that emit and receive wireless signals through the front of device 10 (i.e., through inactive portions IA of display 14) and/or from the rear and sides of device 10. In practice, active components within active display area AA may block or otherwise inhibit signal reception and transmission by the antennas. By placing the antennas within regions 20 and/or 21 of inactive area IA of display 14, the antennas may freely pass signals through the display without the signals being blocked by active display circuitry. Antennas may also be mounted in other portions of device 10, if desired. The configuration of FIG. 1 is merely illustrative.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the space that is available for forming antennas within device 10. In general, antennas that are provided with larger operating volumes or spaces may have higher bandwidth efficiency than antennas that are provided with smaller operating volumes or spaces. If care is not taken, increasing the size of active area AA may reduce the operating space available to the antennas, which can undesirably inhibit the efficiency and bandwidth of the antennas (e.g., such that the antennas no longer exhibit satisfactory radio-frequency performance). It would therefore be desirable to be able to provide antennas that occupy a small amount of space within device 10 (e.g., to allow for as large of a display active area AA as possible) while still allowing the antennas to operate with optimal efficiency and bandwidth.

Figure 2:
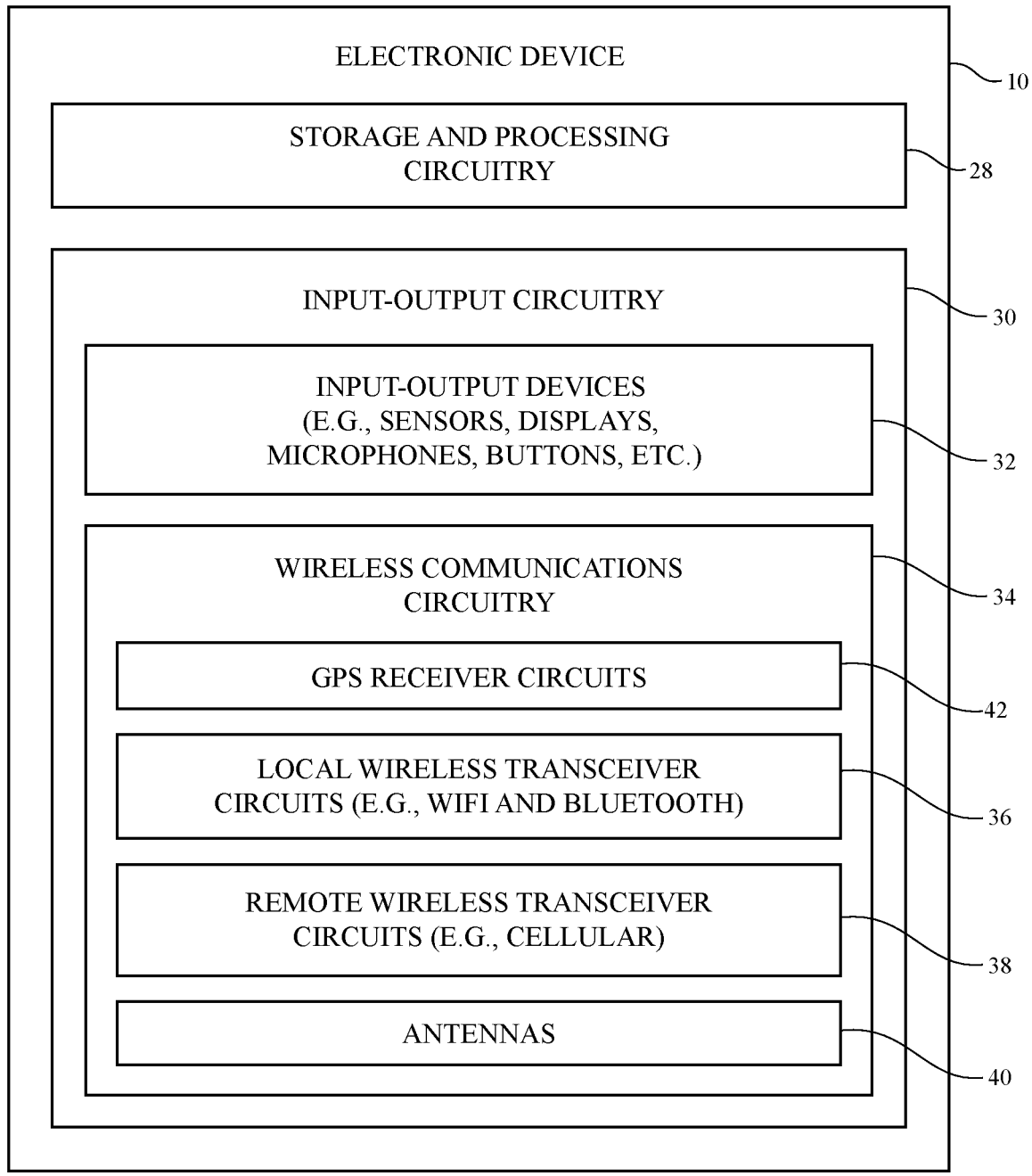
FIG. 2 is a schematic diagram of illustrative circuitry in an electronic device in accordance with an embodiment.

A schematic diagram showing illustrative components that may be used in device 10 of FIG. 1 is shown in FIG. 2. As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, multiple-input and multiple-output (MIMO) protocols, antenna diversity protocols, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, position and orientation sensors (e.g., sensors such as accelerometers, gyroscopes, and compasses), capacitance sensors, proximity sensors (e.g., capacitive proximity sensors, light-based proximity sensors, etc.), fingerprint sensors (e.g., a fingerprint sensor integrated with a button such as button 24 of FIG. 1 or a fingerprint sensor that takes the place of button 24), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may handle wireless local area network (WLAN) bands such as 2.4 GHz and 5 GHz bands for WiFi® (IEEE 802.11) communications and/or wireless personal area network (WPAN) bands such as the 2.4 GHz Bluetooth® communications band. Circuitry 34 may use cellular telephone transceiver circuitry 38 for handling wireless communications in frequency ranges such as a low communications band from 700 to 960 MHz, a low-midband from 960 to 1710 MHz, a midband from 1710 to 2170 MHz, a high band from 2300 to 2700 MHz, an ultra-high band from 3400 to 3700 MHz and/or other communications bands between 600 MHz and 4000 MHz or other suitable frequencies (as examples).

Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc. Wireless communications circuitry 34 may include satellite navigation receive equipment such as global positioning system (GPS) receiver circuitry 42 for receiving GPS signals at 1575 MHz or for handling other satellite positioning data (e.g., Global Navigation Satellite System (GLONASS) signals, etc.). In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Figure 3:
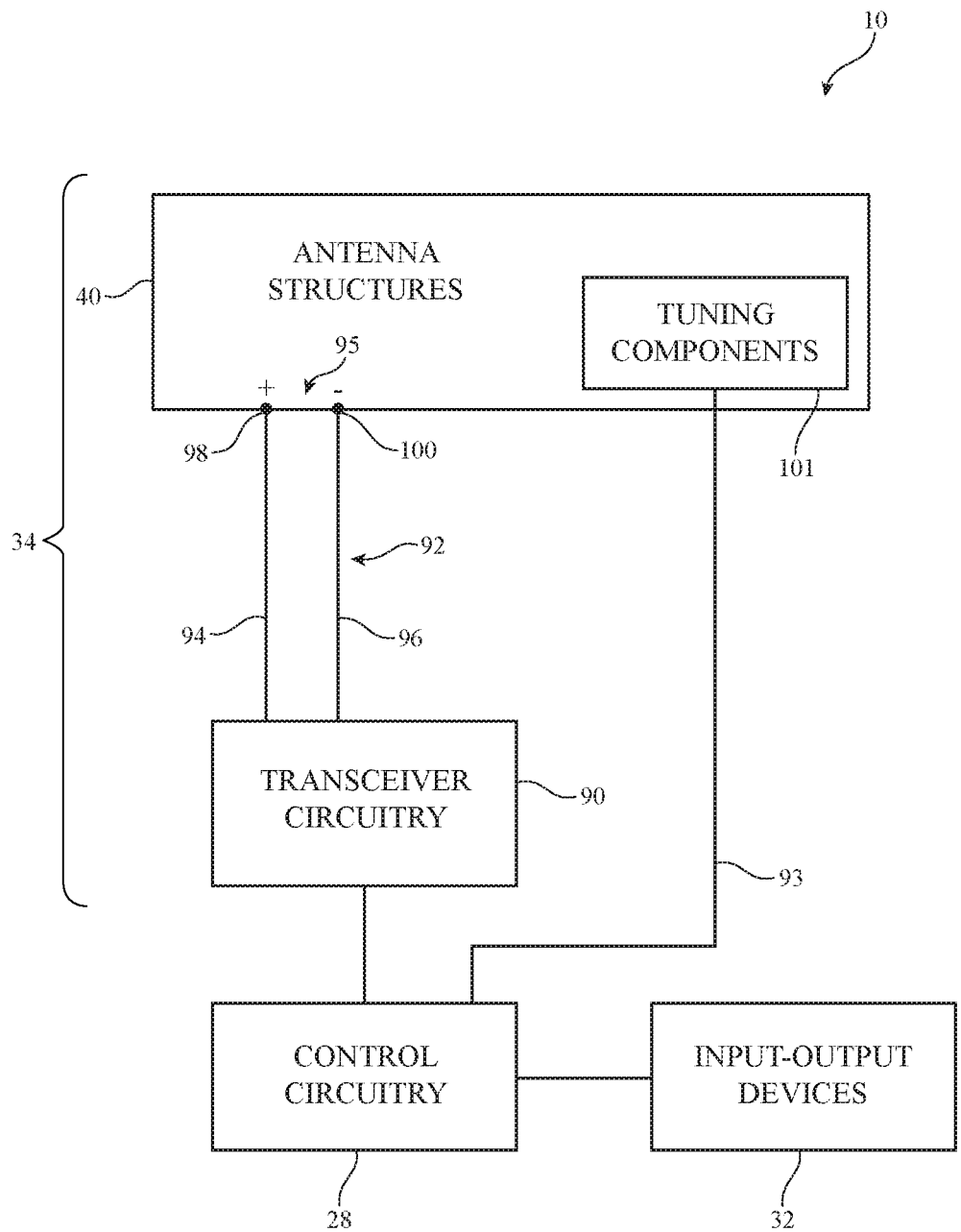
FIG. 3 is a diagram of illustrative wireless circuitry in an electronic device in accordance with an embodiment.

As shown in FIG. 3, transceiver circuitry 90 in wireless circuitry 34 may be coupled to antenna structures 40 using paths such as path 92. Wireless circuitry 34 may be coupled to control circuitry 28. Control circuitry 28 may be coupled to input-output devices 32. Input-output devices 32 may supply output from device 10 and may receive input from sources that are external to device 10.

To provide antenna structures such as antenna(s) 40 with the ability to cover communications frequencies of interest, antenna(s) 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna(s) 40 may be provided with tuning circuits such as tuning components 101 to tune antennas over communications bands of interest. Tuning components 101 may be part of a filter or impedance matching network, may be part of an antenna resonating element, may span a gap between an antenna resonating element and antenna ground, etc.

Tuning components 101 may include fixed components (e.g., inductors having a fixed inductance, resistors having a fixed resistance, capacitors having a fixed capacitance, etc.) and/or may include tunable (adjustable) components such as tunable inductors, tunable capacitors, or other tunable components. Fixed tuning components 101 may include discrete components such as surface mount technology (SMT) capacitors, resistors, and/or inductors and/or may include distributed components such distributed capacitances, resistances, and/or inductances. Adjustable tuning components 101 components may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 28 may issue control signals on one or more paths such as path 93 that adjust inductance values, capacitance values, or other parameters associated with adjustable components in tuning components 101, thereby tuning antenna structures 40 to cover desired communications bands. Fixed components in tuning components 101 may, for example, configure antennas 40 to cover one or more desired frequency bands of interest with satisfactory antenna efficiency using the same conductive structures.

Path 92 may include one or more transmission lines. As an example, signal path 92 of FIG. 3 may be a transmission line having a positive signal conductor such as line 94 and a ground signal conductor such as line 96. Path 92 may sometimes be referred to herein as radio-frequency transmission line 92 or transmission line 92. Transmission lines 92 in device 12 may include coaxial probes realized by metalized vias, microstrip transmission lines, stripline transmission lines, edge-coupled microstrip transmission lines, edge-coupled stripline transmission lines, waveguide structures (e.g., coplanar waveguides, grounded coplanar waveguides, or cavity waveguides), transmission lines formed from combinations of transmission lines of these types, etc. Transmission lines 92 in device 10 may be integrated into rigid and/or flexible printed circuit boards. In one suitable arrangement, transmission lines in device 10 may also include transmission line conductors (e.g., signal and ground conductors) integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain its bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired. For example, a matching network (e.g., an adjustable matching network formed using tuning components 101) may include components such as inductors, resistors, and capacitors used in matching the impedance of antenna(s) 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Transmission line 92 may be coupled to antenna feed structures associated with antenna structures 40. As an example, antenna structures 40 may form an inverted-F antenna, a slot antenna, a loop antenna, or hybrid of these or other types of antennas having an antenna feed 95 with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 100. Other types of antenna feed arrangements may be used if desired. For example, antenna structures 40 may be fed using multiple feeds. The illustrative feeding configuration of FIG. 3 is merely illustrative.

Control circuitry 28 may use information from a proximity sensor (see, e.g., sensors 32 of FIG. 2), wireless performance metric data such as received signal strength information, device orientation information from an orientation sensor, device motion data from an accelerometer or other motion detecting sensor, information about a usage scenario of device 10, information about whether audio is being played through a speaker, information from one or more antenna impedance sensors, and/or other information in determining when antenna(s) 40 is being affected by the presence of nearby external objects or is otherwise in need of tuning. In response, control circuitry 28 may adjust an adjustable inductor, adjustable capacitor, switch, or other tunable component 101 and/or may switch one or more antennas 40 into or out of use to ensure that wireless communications circuitry 34 operates as desired.

The presence or absence of external objects such as a user's hand may affect antenna loading and therefore antenna performance. Antenna loading may differ depending on the way in which device 10 is being held. For example, antenna loading and therefore antenna performance may be affected in one way when a user is holding device 10 in a portrait orientation and may be affected in another way when a user is holding device 10 in a landscape orientation. To accommodate various loading scenarios, device 10 may use sensor data, antenna measurements, information about the usage scenario or operating state of device 10, and/or other data from input-output circuitry 32 to monitor for the presence of antenna loading (e.g., the presence of a user's hand, the user's head, or another external object). Device 10 (e.g., control circuitry 28) may then adjust tunable components 101 in antenna 40 and/or may switch other antennas into or out of use to compensate for the loading (e.g., multiple antennas 40 may be operated using a diversity protocol to ensure that at least one antenna 40 may maintain satisfactory communications even while the other antennas are blocked by external objects).

Figure 4:
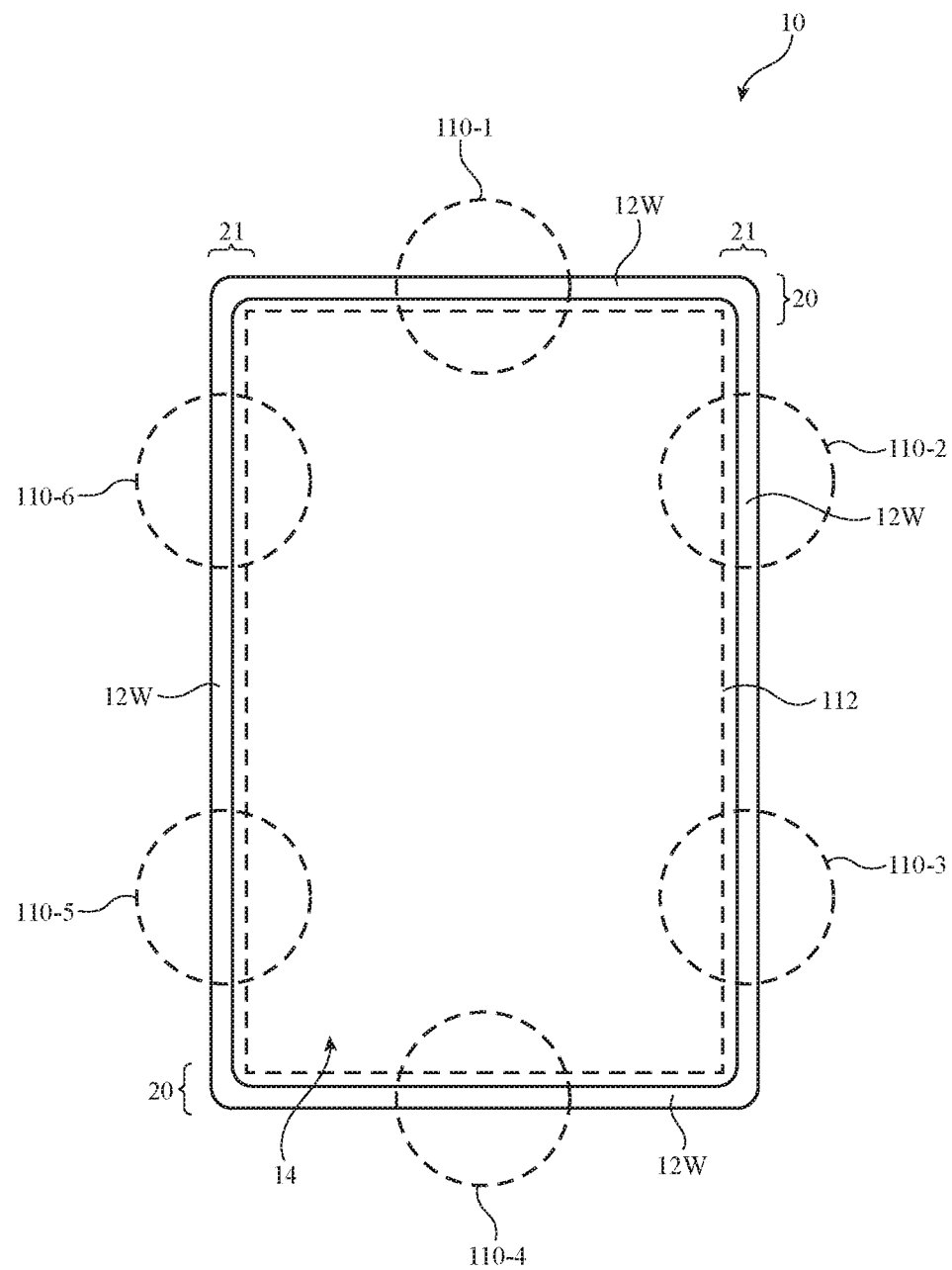
FIG. 4 is a top view of an illustrative electronic device having one or more antennas formed from conductive housing structures around an active area of a display in accordance with an embodiment.

A top interior view of an illustrative device 10 that contains antennas 40 is shown in FIG. 4. As shown in FIG. 4, device 10 may have peripheral conductive housing structures such as peripheral conductive housing sidewalls 12W (e.g., four peripheral conductive housing sidewalls 12W that surround the rectangular periphery of device 10). Display 14 may have a display module 112. Peripheral conductive housing sidewalls 12W may run around the periphery of display module 112 (e.g., along all four sides of device 10). Display module 112 may be covered by a display cover layer (not shown). The display cover layer may extend across the entire length and width of device 10 and may, if desired, be mounted to or otherwise supported by peripheral conductive housing sidewalls 12W.

Display module 112 (sometimes referred to as a display panel, active display circuitry, or active display structures) may be any desired type of display panel and may include pixels formed from light-emitting diodes (LEDs), organic LEDs (OLEDs), plasma cells, electrowetting pixels, electrophoretic pixels, liquid crystal display (LCD) components, or other suitable pixel structures. The lateral area of display module 112 may, for example, determine the size of the active area of display 14 (e.g., active area AA of FIG. 1). Display panel 112 may include active light emitting components, touch sensor components (e.g., touch sensor electrodes), force sensor components, and/or other active components. Regions 21 and 20 of device 10 may define the inactive area of display 14 (e.g., inactive area IA of FIG. 1). Regions 21 may, for example, be defined by the lateral area of device 10 extending between the left or right edges of display module 112 and the exterior surface of peripheral conductive housing sidewalls 12W. Regions 20 may, for example, be defined by the lateral area of device 10 extending between the upper or lower edge of display module 112 and the exterior surface of peripheral conductive housing sidewalls 12W. If desired, display module 112 may be supported within electronic device 10 by a conductive display support plate (sometimes referred to as a midplate or display plate), a conductive display frame, and/or a dielectric display frame. The display frame(s) for module 112 may, for example, be ring-shaped and may include a portion that runs around the periphery of the display module 112 and surrounds a central opening.

In practice, regions 20 and 21 may be too narrow for certain types of antennas (e.g., inverted-F antennas or patch antennas) to operate with satisfactory bandwidth and/or efficiency. In some scenarios, one or more antennas 40 may be formed from radiating elements within the rear housing wall of device 10 (e.g., conductive rear housing wall 12R of FIG. 1) to provide the antennas with a greater operating volume. However, for some operating frequencies such as frequencies within the 5 GHz wireless local area network band, antennas in the rear housing wall may exceed regulatory limits on radiation absorbed by a user of device 10. If desired, one or more antennas 40 may be formed within peripheral regions 20 and/or 21 of device 10 (e.g., locations where regulatory limits on absorbed radiation may be more easily satisfied). In order to form radiating elements for antennas in regions 20 and 21, conductive material may be removed from peripheral conductive housing sidewalls 12W. However, if care is not taken, antennas formed by removing conductive material from peripheral conductive housing sidewalls 12W may weaken the mechanical strength of housing 12 and device 10 (e.g., leaving device 10 vulnerable to mechanical damage). In order to mitigate these issues, antennas 40 may be formed using radiating slots that are formed in portions of peripheral conductive housing sidewalls 12W (e.g., radiating slots that minimize the amount of conductive material that needs to be removed from peripheral conductive housing sidewalls 12W).

Antennas (e.g., antennas 40 of FIG. 3) may be formed at any desired locations 110 within regions 20 and 21 such as at a first location 110-1 along the upper peripheral conductive housing sidewall 12W of device 10 (e.g., within region 20), a second location 110-2 along the right peripheral conductive housing sidewall 12W of device 10 (e.g., within region 21), a third location 110-3 along the right peripheral conductive housing sidewall 12W of device 10, a fourth location 110-4 along the lower peripheral conductive housing sidewall 12W of device 10, a fifth location 110-5 along the left peripheral conductive housing sidewall 12W of device 10, and/or a sixth location 110-6 along the left peripheral conductive housing sidewall 12W of device 10. These examples are merely illustrative and, in general, antennas 40 may be formed at any desired locations within regions 21 and/or 20.

If desired, antennas that are configured to cover the same frequency bands may be formed at multiple locations 110 in device 10 (e.g., for enabling antenna diversity or multiple-input and multiple-output (MIMO) operations). In one suitable arrangement, a first antenna for covering the 5 GHz WLAN frequency band may be formed at location 110-6 whereas a second antenna for covering the 5 GHz WLAN frequency band may be formed at location 110-3. In another suitable arrangement, a first antenna for covering the 5 GHz WLAN frequency band may be formed at location 110-2 whereas a second antenna for covering the 5 GHz WLAN frequency band may be formed at location 110-5. In yet another suitable arrangement, a first antenna for covering the 5 GHz WLAN frequency band may be formed at location 110-1 whereas a second antenna for covering the 5 GHz WLAN frequency band may be formed at location 110-4. Placing the antennas within device 10 in this way may, for example, ensure that at least one of the antennas is not being blocked by an external object such as a user's hand regardless of the orientation of device 10. These examples are merely illustrative and, in general, any desired antennas for covering any desired bands may be formed within one or more of locations 110 of FIG. 4 or at other locations within regions 20 and 21.

Figure 5:
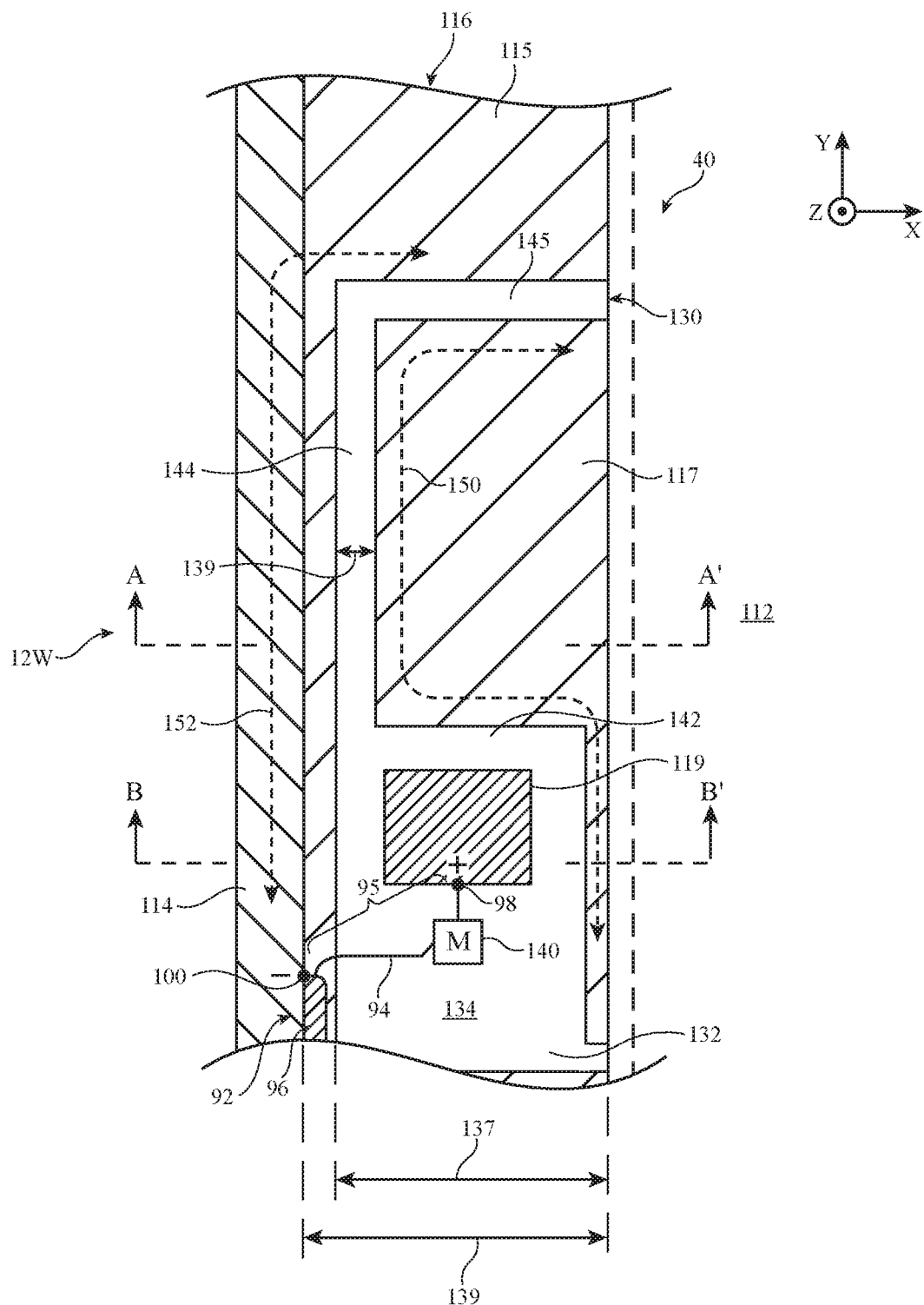
FIG. 5 is a top view of an illustrative antenna that may be formed from a radiating slot in a conductive housing ledge for an electronic device in accordance with an embodiment.

FIG. 5 is a top view showing how antenna 40 may be formed from a radiating slot in a corresponding region 110 of FIG. 4. In the example of FIG. 5, antenna 40 is formed along the left side of device 10 (e.g., within region 110-6 or 110-5 of FIG. 4). This is merely illustrative and, in general, antenna 40 may be formed in regions 110-1, 110-2, 110-3, 110-4, or any other desired locations along regions 20 or 21 of FIG. 4.

As shown in FIG. 5, a given peripheral conductive housing sidewall 12W may run along the periphery of display module 112. Peripheral conductive housing sidewall 12W may include a vertically-extending portion 114 (sometimes referred to herein as vertical portion 114 or vertical sidewall portion 114) that extends across the height (thickness) of device 10 (e.g., along the Z-axis of FIG. 5 or perpendicular to the front and rear faces of device 10). Peripheral conductive housing sidewall 12W may include integral ledge portions such as horizontally-extending integral ledge portion 116. Integral ledge portion 116 may extend away from vertical wall portion 114 towards the interior of device 10 (e.g., within the X-Y plane of FIG. 5).

Integral ledge portion 116 of peripheral conductive sidewall 12W may sometimes be referred to herein as ledge portion 116 of peripheral conductive housing sidewall 12W, integral ledge 116 of peripheral conductive housing sidewall 12W, ledge 116, integral datum portion 116 of peripheral conductive housing sidewall 12W, integral datum 116 of peripheral conductive housing sidewall 12W, or datum 116. Integral ledge portion 116 and vertical portion 114 (i.e., peripheral conductive housing sidewall 12W) may be formed from the same single piece of conductor (e.g., peripheral conductive housing sidewall 12W may be machined from the same block of metal or otherwise manufactured such that ledge 116 is integral with vertical portion 114 and no adhesives, solder, screws, or other fasteners are required to affix the ledge to the vertical portion). Forming integral ledge portion 116 from the same conductor as vertical portion 114 (e.g., integral with peripheral conductive housing sidewall 12W) may, for example, optimize the mechanical integrity of device 10 and reduce the amount of space required to implement ledge 116 relative to scenarios where adhesives are used to affix a separate bracket to the vertical portion of peripheral conductive housing sidewall 12W. Integral ledge portion 116 may extend towards the interior of device 10 substantially perpendicular to the interior surface of vertical portion 114 (e.g., integral ledge portion 116 may extend beyond the interior surface of vertical portion 114 towards the interior of the device).

Each peripheral conductive housing sidewall 12W in device 10 (e.g., each of the four peripheral conductive housing sidewalls shown in FIG. 4) may have a respective and discrete integral ledge 116 (e.g., where the integral ledge portion of a given peripheral conductive housing sidewall 12W is discontinuous with the ledge portion of the adjacent peripheral conductive housing sidewalls 12W) or integral ledge 116 may extend continuously around two or more of peripheral conductive housing sidewalls 12W (e.g., around all four sidewalls of device 10). Integral ledge 116 may extend along the length of its corresponding peripheral conductive housing sidewall 12W (e.g., in the direction of the Y-axis in FIG. 5) only at the locations of antennas 40, along portions of the peripheral conductive housing sidewall that do not include antennas, across an entirety of the length of the corresponding peripheral conductive housing sidewall, or across any desired subset of the length of the corresponding peripheral conductive housing sidewall (e.g., along more than 25% of the length of the wall, more than 50% of the length of the wall, etc.). Integral ledges 116 of peripheral conductive housing sidewalls 12W may be used to mount various components within device 10 if desired. For example, integral ledge 116 may be used to mount portions of the display to housing 12 (e.g., a display frame, a display cover layer, etc.).

In order to define the radiating elements of antenna 40, one or more slots such as slots 142, 144, and 145 may be formed in integral ledge 116 of peripheral conductive housing sidewall 12W. Slots 142, 144, and/or 145 (sometimes referred to herein as notches, gaps, or openings) may be formed by removing conductive material from integral ledge 116 or upon formation (manufacture) of integral ledge 116 or device 10.

As shown in FIG. 5, slots 142, 144, and 145 may separate a first portion 115 of integral ledge 116 from a second portion 117 of integral ledge 116 (sometimes referred to herein as conductive portions 115 and 117, conductive layers 115 and 117, conductive structures 115 and 117, or conductors 115 and 117). A dielectric support structure such as dielectric substrate 132 may be formed under integral ledge 116 (e.g., conductive portions 115 and 117 of integral ledge 116 may be formed on top surface 134 of substrate 132). Dielectric substrate 132 may include plastic, foam, ceramic, glass, a dielectric portion of housing 12 such as a dielectric housing frame that extends around some or all of the periphery of device 10, or any other desired dielectric materials. Conductive portion 117 may be formed from the same material as conductive portion 115 or may be formed from conductive traces, sheet metal, or metal foil placed on surface 134 of substrate 132. While conductive portion 117 of integral ledge 116 may be coplanar with portion 115 of integral ledge 116, conductive portion 117 need not be formed from the same integral piece of metal used to form portion 115 of integral ledge 116 and vertical portion 114 of peripheral conductive housing sidewall 12W (e.g., while forming a part of integral ledge 116 of peripheral conductive housing sidewall 12W, conductive portion 117 need not be galvanically connected to conductive portion 115 and slots 142, 144, and 145 may completely separate conductive portion 117 from conductive portion 115). In another suitable arrangement, conductive portion 117 may be connected to at least some of conductive portion 115 (e.g., conductive portion 117 may be formed from the same integral piece of conductor as portion 115 and vertical portion 114 of peripheral conductive housing sidewall 12W). If desired, conductive portion 117 may have an integral vertically extending portion that extends downwards over side (surface) 130 of substrate 132 (e.g., in the Y-Z plane of FIG. 5).

Antenna 40 may be fed using a conductive feed probe such as feed conductor 119 (sometimes referred to herein as feed probe 119, probe 119, radiative feed conductor 119, or feed element 119). Feed conductor 119 may be formed from the same material as integral ledge 116, from a conductive trace on substrate 132, from metal foil, sheet metal, or any other desired conductive structures. Feed conductor 119 may be formed on surface (side) 134 of substrate 132 and interposed within slot 142. Feed conductor 119 may be coupled to positive feed terminal 98 of antenna feed 95. Signal conductor 94 of transmission line 92 may be coupled to feed terminal 98. If desired, matching circuitry such as matching circuit 140 may be interposed on signal conductor 94. Matching circuit 140 may be fixed or adjustable and may ensure that transmission line 92 is impedance matched to antenna 40 at desired frequencies. Ground terminal 100 of antenna feed 95 may be coupled to ground conductor 96 of transmission line 92. Ground terminal 100 may be coupled to vertical portion 114 or conductive portion 115 of peripheral conductive housing sidewall 12W.

Antenna feed 95 may convey radio-frequency signals handled by transceiver circuitry coupled to transmission line 92 (e.g., transceiver circuitry 90 of FIG. 3). Feed conductor 119 may indirectly feed (excite) conductive portion 117 of integral ledge 116 via near-field electromagnetic coupling. In other words, antenna signals conveyed to feed conductor 119 via terminal 98 may induce antenna currents to flow along the perimeter of conductive portion 117 via near-field electromagnetic coupling, as shown by arrow 150. Antenna currents corresponding to the radio-frequency signals may also be conveyed along conductive portion 115 of integral ledge 116 on the side of slots 145, 144, and 142 opposite to conductive portion 117, as shown by arrow 152. In this way, feed conductor 119 may be directly fed (by a feed terminal 98 in contact with conductor 119) whereas conductive portions 115 and 117 are indirectly fed (via near-field electromagnetic coupling). Antenna currents 152 and 150 as well as antenna currents on feed conductor 119 may generate corresponding wireless signals that are transmitted by antenna 40 or, conversely, may be generated in response to received wireless signals. In other words, antenna currents 152 and 150 and the antenna currents on feed conductor 119 may contribute to the radiative performance (e.g., antenna efficiency) and frequency response of antenna 40, for example.

The perimeter of slots 145, 144, and 142 (e.g., the dimensions of the edges of conductive portions 115 and 117 defining the edges of slots 145, 144, and 142) as well as the dimensions of feed conductor 119 may define the resonating characteristics of antenna 40. For example, the perimeter of slots 145, 144, and 142 and/or the dimensions of feed conductor 119 may be selected so that antenna 40 covers a desired frequency band of interest (e.g., a 5 GHz frequency band between about 5150 MHz and 5850 MHz or other suitable frequencies). Slots 145, 144, and 142 may, for example, form a single continuous open slot radiating element for antenna 40 having a perimeter that is selected to be approximately equal to one half of a wavelength of operation for antenna 40. When configured in this way, antenna 40 may form a slot antenna, for example. Slots 144, 145, and 142 may sometimes be collectively referred to herein as a slot antenna resonating element, slot antenna radiating element, slot radiating element, slot radiator, slot element, or slot for antenna 40 (e.g., an open slot antenna resonating element, open slot element, or open slot). Slots 144, 142, and 145 may each form elongated slot segments of the slot element in antenna 40.

This example is merely illustrative and, if desired, slots 145, 144, and 152 may collectively form a closed slot radiating element for antenna 40 having a perimeter selected to be approximately equal to a wavelength of operation for antenna 40 (e.g., a wavelength corresponding to a frequency in the 5 GHz WLAN band). Harmonic modes of the slot element in antenna 40 may also be configured to cover the frequency band of interest (e.g., the perimeter of the slot element may be configured to cover the frequency band of interest in its first harmonic mode, second harmonic mode, third harmonic mode, etc.).

In the example of FIG. 5, slot 144 extends from an end of slot 142 and slot 145 extends from an opposing end of slot 144 (e.g., so that slots 144, 142, and 145 form a continuous slot element for antenna 40). Slot 145 may have an open end at side 130 of substrate 132 if desired. The opposing end of slot 142 may be closed or may be opened (e.g., conductive portion 117 may be separated from the conductive portion of integral ledge 116 below slot 142 (e.g., along the Y-axis of FIG. 5) or may be connected to this portion of integral ledge 116. In another suitable arrangement, conductive material (e.g., a conductor on side 130 or side 134 of substrate 132) may couple conductive portion 115 to conductive portion 117 to close off the end of slot 145 (e.g., so that the slot element of antenna 40 is a closed slot).

In the example of FIG. 5, integral ledge 116 has a width 139 extending from vertical portion 114 of peripheral conductive housing sidewall 12W. Width 139 may be, for example, between 1 mm and 5 mm, between 1 mm and 3 mm, between 0.5 mm and 5 mm, between 0.2 mm and 3 mm, less than 5 mm, less than 3 mm, etc. While cutting slots such as slots 142, 144, and 145 in integral ledge 116 may reduce the overall mechanical stability and reliability of peripheral conductive housing sidewall 12W, this reduction in mechanical reliability may be minimized by maximizing the amount of conductive material that remains in integral ledge 116 (e.g., by minimizing the lateral area of slots 145, 144, and 142). If desired, slot 142 may have a width 137 whereas slots 144 and 145 have a smaller width 139. Similarly, conductive portion 117 may be wider adjacent to slot 144 than adjacent to slot 142. This may, for example, serve to maximize the amount conductive material within integral ledge 116 while still allowing space to accommodate feed conductor 119. If desired, feed conductor 119 may have as large an area as possible (e.g., while still allowing antenna 40 to radiate at desired frequencies) so as to minimize the lateral area of slot 142 and thereby maximize the mechanical strength of integral ledge 116 and peripheral conductive housing sidewall 12W.

The example of FIG. 5 is merely illustrative. In general, slots 145, 144, and 142 may have any desired shapes (e.g., shapes with curved and/or straight edges). Feed conductor 119 may have any desired shape having fewer or more than four sides, curved edges, and/or straight edges. In another suitable arrangement, feed conductor 119 may be formed from a loop or half loop-shaped resonating element. In the example of FIG. 5, slots 144, 145, and 142 each have elongated shapes, where slot 144 extends along a longitudinal axis parallel to the longitudinal axis of slot 142 and slot 145 extends along a longitudinal axis perpendicular to slots 142 and 145. If desired, slots 144 and/or 145 may extend at other angles with respect to each other and with respect to slot 142. Additional slot segments may be formed in antenna 40 if desired (e.g., the slot radiating element in antenna 40 may follow a meandering path of curved and/or straight segments if desired).

Figure 6:
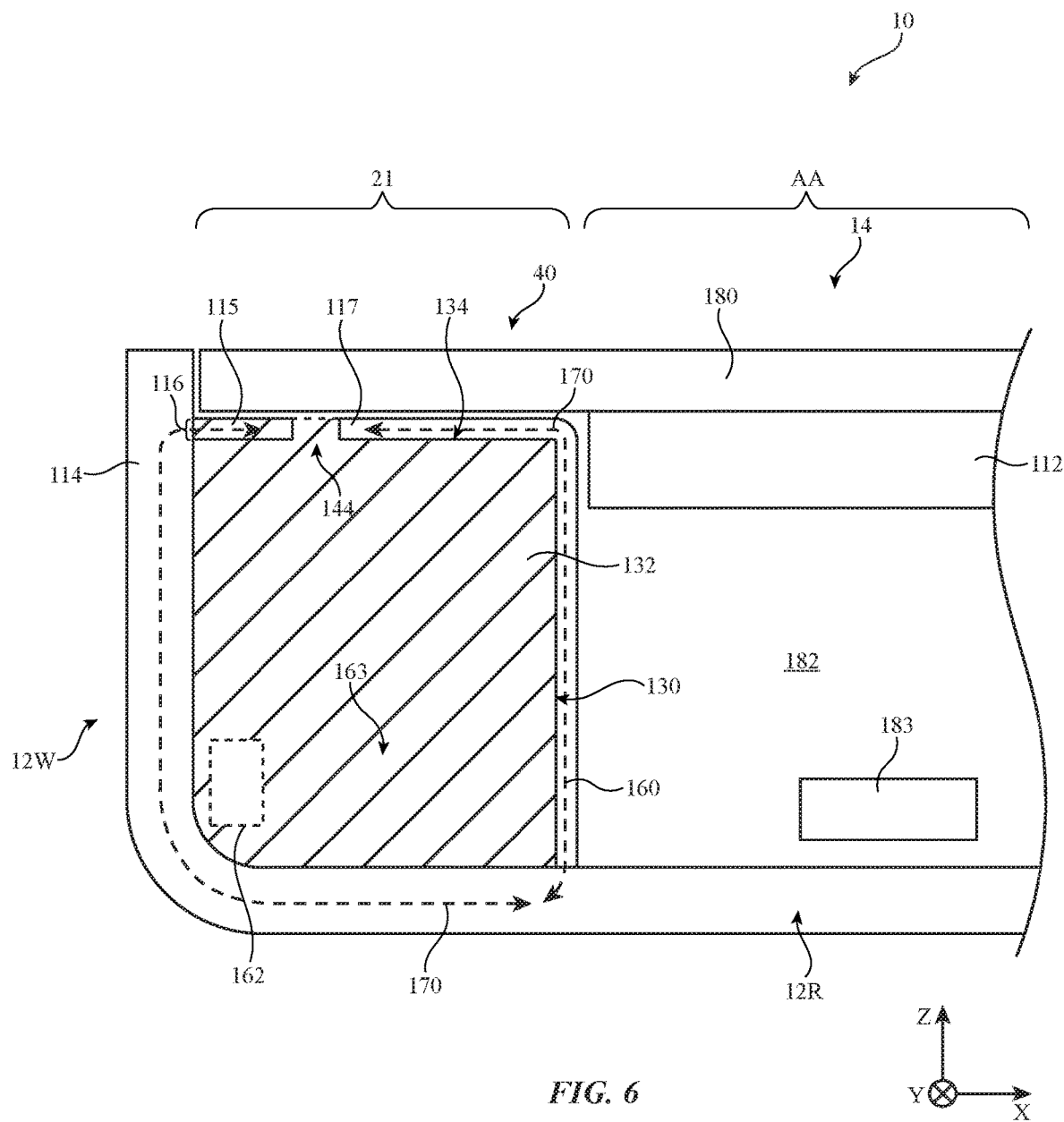
FIG. 6 is a cross-sectional side view of an illustrative antenna having a radiating slot in a conductive housing ledge in accordance with an embodiment.

FIG. 6 is a cross-sectional side view of antenna 40 having a slot radiating element formed in integral ledge 116 (e.g., as taken along line AA' of FIG. 5). As shown in FIG. 6, display 14 for electronic device 10 may include a display cover layer such as display cover layer 180 that covers display panel 112. The lateral area of display panel 112 may, for example, determine the size of active area AA of display 14 (e.g., in the X-Y plane of FIG. 6). Display cover layer 180 may be a layer of clear glass, plastic, or other dielectric that covers the light-emitting surface of the underlying display module. In another suitable arrangement, display cover layer 180 may be the outermost layer of display module 112 (e.g., layer 180 may be a color filter layer, thin-film transistor layer, or other display layer). Buttons may pass through openings in cover layer 180 if desired. The cover layer may also have other openings such as an opening for a speaker port), openings for a sensor, or openings for any other desired electronic component. The inner surface of cover layer 180 may be covered with an opaque masking layer such as an ink layer if desired (e.g., to hide components within inactive region 21 from view of the user). Portions of cover layer 180 may be tinted or provided with pigment so as to be opaque if desired. Display panel 112 may be supported within electronic device 10 by a conductive display support plate, a conductive display frame, and/or a dielectric display frame that hold display panel 112 in place on housing 12. Other components 183 may be formed within interior cavity (volume) 182 within device 10. Components 183 may include, for example, storage and processing circuitry, sensors or other input-output devices, substrates such as printed circuit boards, a battery, power supply or power converter circuitry, transceiver circuitry or other wireless circuitry, etc.

As shown in FIG. 6, peripheral conductive housing sidewall 12W may include vertically-extending portion 114 (e.g., a portion that extends from the front face to the rear face of device 10) and integral ledge portion 116 extending away from vertical portion 114 towards interior cavity 182. Display cover layer 180 may be mounted to integral ledge 116 to hold display 14 in place on housing 12. If desired, adhesive may be interposed between cover layer 180 and integral ledge 116 to hold display cover layer 180 in place. Opaque masking layers, gaskets, seals, or other dielectric layers may be interposed between integral ledge 116 and cover layer 180 if desired. This is merely illustrative. If desired, the dielectric frame, conductive frame, and/or support plate for display module 112 may be mounted to integral ledge 116.

In the example of FIG. 6, some of vertically extending wall portion 114 extends around the periphery of cover layer 180. This is merely illustrative and, in another suitable arrangement, the peripheral edge of cover layer 180 may lie flush with the exterior (vertical) surface of peripheral conductive housing sidewall 12W (e.g., layer 180 may extend across an entirety of the front face of device 10).

Conductive rear housing wall 12R may form the rear face of electronic device 10 opposing display cover layer 180 (e.g., vertical sidewall portion 114 may extend from cover layer 180 to conductive rear housing wall 12R). Conductive rear housing wall 12R may be formed from conductive material such as metal (e.g., wall 12R may be formed from the same integral conductor as peripheral conductive housing sidewall 12W). If desired, a dielectric layer may by formed under conductive rear housing wall 12R so that the dielectric layer forms the exterior surface of device 10. Conductive rear housing wall 12R may, if desired, extend across the entire length and/or width of device 10 (e.g., between opposing peripheral conductive housing sidewalls 12W as shown in FIG. 4).

Figure 7:
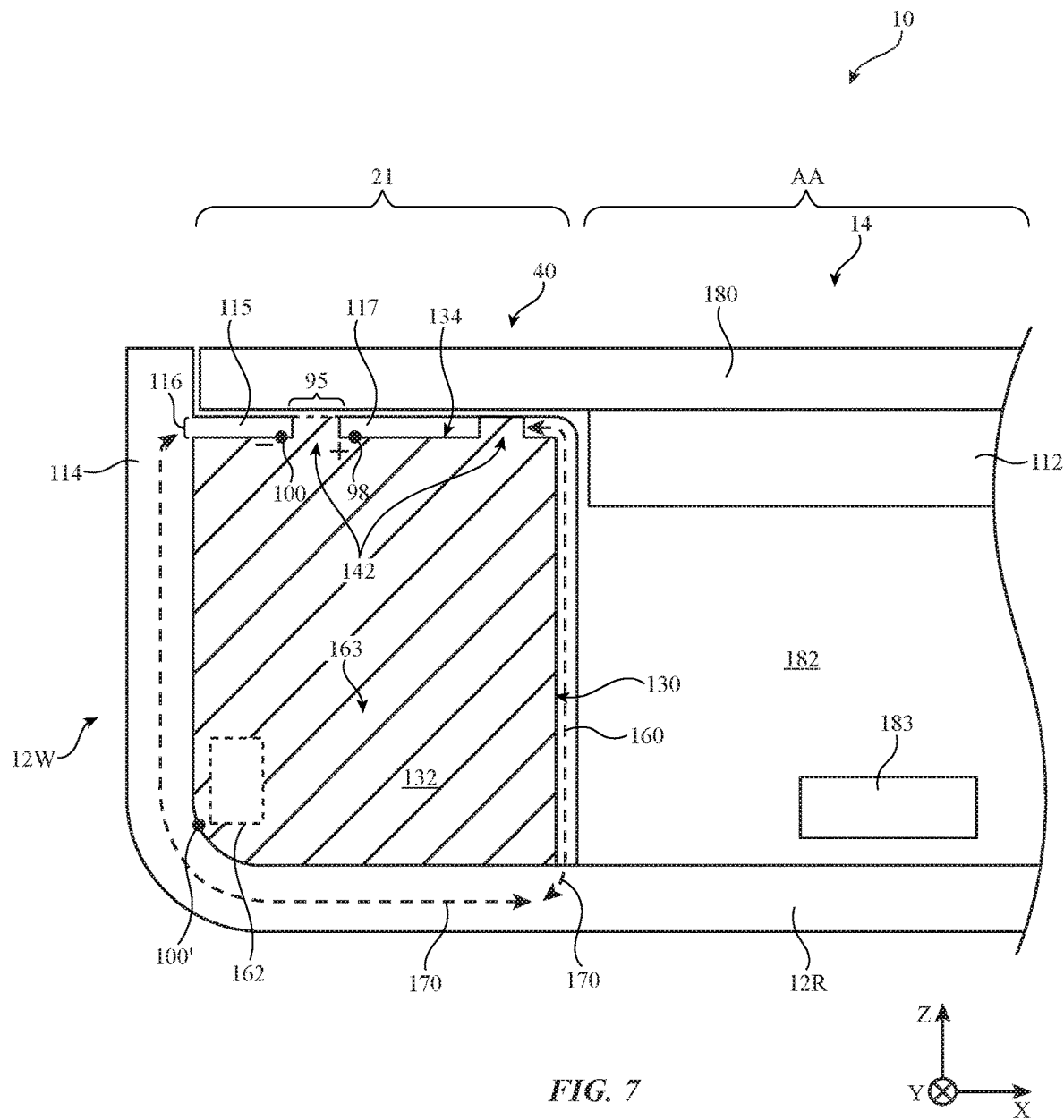
FIG. 7 is a cross-sectional side view of an illustrative antenna feed probe for an antenna of the type shown in FIGS. 5 and 6 in accordance with an embodiment.

As shown in FIG. 7, antenna 40 may be mounted in housing 12 under cover layer 180 within region 21. During operation, antenna signals may be transmitted and received through a portion of display cover layer 180. Forming antenna 40 under inactive region 21 of display 14 may allow antenna 40 to transmit and receive radio-frequency signals through display cover layer 180 without the signals being blocked or otherwise impeded by active circuitry in display module 112.

As shown in FIG. 7, integral ledge 116 of peripheral conductive housing sidewall 12W may be formed on upper surface 134 of dielectric substrate 132. While conductive portion 117 of integral ledge 116 may be separated from conductive portion 115 of integral ledge 116 by the slot element in antenna 40, conductive portion 117 may still sometimes be referred to herein as a part of integral ledge 116 because at least some of integral ledge 116 is formed from an integral piece of conductor with vertical portion 114 (i.e., conductive portion 115), conductive portion 117 lies within the same plane as conductive portion 115 (e.g., at the same surface of substrate 132), and because display cover layer 180 is mounted to (supported by) conductive portion 117 on substrate 132, for example. In another suitable arrangement, conductive portion 117 may be galvanically connected to at least some of conductive portion 115.

Dielectric substrate 132 may extend from conductive rear housing wall 12R to integral ledge 116 or may only extend part of the way between integral ledge 116 and conductive rear housing wall 12R. If desired, dielectric substrate 132 may have a cavity or hollow portion. Components may be mounted within the hollow portion of substrate 132 if desired. In one example, components such as magnet 162 may be formed within substrate 132 (e.g., embedded within substrate 132 or placed within a hollow cavity in substrate 132). Magnet 162 may, for example, supply a magnetic field to the exterior of peripheral conductive housing sidewall 12W. This magnetic field may, for example, be used to attach accessory devices such as a cover or case for device 10 or to affix a stylus or other device to peripheral conductive housing sidewall 12W of device 10. This is merely illustrative and, if desired, other components may be formed within substrate 132.

Radiating slot 144 may be formed in integral ledge 116 of peripheral conductive housing sidewall 12W at surface 134 of substrate 132 (e.g., between conductive portions 115 and 117). This is merely illustrative. If desired, conductive portion 115 may be omitted from antenna 40 and slot 144 may be defined between vertical portion 114 and conductive portion 117 of peripheral conductive housing sidewall 12W or may extend into vertical portion 114 of peripheral conductive housing sidewall 12W (e.g., as a part of a groove or notch in vertical portion 114 in the X-Y plane of FIG. 6).

In practice, radiating slot 144 and antenna 40 may be susceptible to noise and interference from display module 112 and/or components 183 within cavity 182 (e.g., a battery for device 10). If desired, a conductive layer such as layer 160 may couple conductive portion 117 on surface 134 of substrate 132 to conductive rear housing wall 12R (e.g., conductive layer 160 may extend over side 130 of substrate 132). Conductive layer 160 may be formed from conductive traces, metal foil, sheet metal, or other conductive structures. Conductive layer 160 may be coupled to conductive portion 117 using solder, welds, clips, conductive adhesive, or other conductive interconnect structures. If desired, conductive layer 160 and conductive portion 117 may be formed from the same integral piece of conductor that is folded over sides 134 and 130 of substrate 132. Conductive layer 160 may be shorted to conductive rear housing wall 12R using solder, conductive adhesive, conductive pins, conductive springs, conductive screws, other conductive fasteners, or other conductive interconnects. Conductive layer 160 may be deposited over substrate 132 after substrate 132 has been placed on conductive rear housing wall 12R or, in another suitable arrangement, substrate 132 may be formed from injection-molded plastic that is injected into the cavity defined by structures 116, 114, 12R, and 160.

Conductive layer 160 may serve to electromagnetically isolate (shield) slot 144 and antenna 40 from other components such as display module 112 and components 183. For example, conductive layer 160 may prevent components 183 from generating interference on antenna signals conveyed by antenna 40 and may prevent antenna signals conveyed by antenna 40 from interfering with components 183. In addition, conductive layer 170 may serve to isolate components 183 from magnetic fields produced by magnet 162.

Conductive layer 160, integral ledge 116 of peripheral conductive housing sidewall 12W, vertical portion 114 of peripheral conductive housing sidewall 12W, and conductive rear housing wall 12R may define the edges (e.g., walls or boundaries) of a conductive cavity 163 for antenna 40 (e.g., antenna 40 may be a cavity-backed slot antenna). Conductive cavity 163 may serve to enhance the radiative properties of antenna 40 (e.g., to enhance the gain, efficiency, and/or bandwidth of antenna 40 in the corresponding frequency band of interest). While antenna 40 is conveying antenna signals (e.g., while antenna currents 150 and 152 of FIG. 5 are being conveyed over conductive portions 115 and 117), corresponding antenna currents may also flow over vertical sidewall portion 114, conductive rear housing wall 12R, and conductive shielding layer 160, as shown by arrows 170. If desired, the path length of currents 170 may be selected to enhance the radiating characteristics of antenna 40 in the corresponding frequency band of interest (e.g., the perimeter of slots 144, 145, and 142 of FIG. 5 as well as the perimeter of cavity 163 defined by structures 116, 114, 12R, and 160 of FIG. 6 may be selected so that antenna 40 radiates within a desired frequency band of interest). By distributing the antenna current over three dimensions in this way (e.g., across integral ledge 116, vertical wall portion 114, conductive rear housing wall 12R, and conductive layer 160), the operating volume of antenna 40 may be greater than if antenna 40 were confined to a single plane, thereby serving to optimize the bandwidth and efficiency of antenna 40 despite the relatively narrow width of region 21.

In the example of FIG. 6, substrate 132 (sometimes referred to herein as carrier 132) has a polygonal cross-sectional shape (e.g., the sides of substrate 132 are substantially planar). This is merely illustrative. If desired, some or all of one or more of the sides of substrate 132 may be curved. In general, the sides of substrate 132 may conform to (e.g., accommodate, extend parallel to, or abut) the shape of peripheral conductive housing sidewall 12W and conductive rear housing wall 12R. Each of the sides of substrate 132 may extend from the other sides of substrate 132 at any desired angles.

FIG. 7 is a cross-sectional side view of the feed radiator for antenna 40 (e.g., as taken along line BB' of FIG. 5). As shown in FIG. 7, feed conductor 119 may be formed from a patch of conductive material (sometimes referred to herein as a conductive patch or patch element) on surface 134 of substrate 132 within slot 142 in integral ledge 116. The edges of slot 142 may be defined between conductive portion 115 of integral ledge 116 and conductive layer 160 on side 130 of substrate 132. This is merely illustrative. If desired, conductive portion 115 may be omitted and slot element 142 may be defined between vertical sidewall portion 114 and conductive layer 160 or may extend into vertical sidewall portion 114 (e.g., as a part of a groove or notch in vertical sidewall portion 114 in the X-Y plane of FIG. 7). In another suitable arrangement, a portion of conductive portion 117 on side 134 of substrate 132 may define the opposing side of slot 142.

Antenna feed 95 for antenna 40 may be coupled across portions of slot 142. Positive antenna feed terminal 98 for antenna 40 may be coupled to feed conductor 119 at surface 134 of substrate 132. The signal conductor coupled to feed terminal 98 (e.g., signal conductor 94 of FIG. 5) may be formed from conductive traces on surface 134 of substrate 132, from other conductive structures over substrate 132, from conductive structures (e.g., wires, traces, springs, pins, etc.) extending through hollow portions of substrate 132 (e.g., within the cavity defined by structures 114, 116, 160, and 12R), and/or may be formed from conductive structures embedded within substrate 132 (e.g., conductive through-vias in substrate 132).

Ground antenna feed terminal 100 for antenna 40 may be coupled to conductive portion 115 of integral ledge 116 (e.g., on the side of slot 142 opposite to feed conductor 119). This is merely illustrative. Ground antenna feed terminal 100 may be coupled to vertical sidewall portion 114 if desired (e.g., in scenarios where conductive portion 115 is omitted from antenna 40 and slot 142 is defined in part by vertical sidewall portion 114). If desired, ground feed terminal 100 may be located at any other desired location along the height of vertical sidewall portion 114, such as the location shown by ground feed terminal 100' adjacent to conductive rear housing wall 12R. Ground feed terminal 100 may be located on conductive rear housing wall 12R or conductive layer 160 in other suitable arrangements. If desired, the transmission line ground conductor (e.g., ground conductor 96 of FIG. 5) may be coupled to multiple locations in antenna 40 such as at both ground terminals 100 and 100'.

Antenna feed 95 may feed antenna signals to feed conductor 119. Antenna signals flowing over feed conductor 119 may contribute to the response of antenna 40 if desired. In addition, the antenna signals flowing over feed conductor 119 may excite slot 142, causing antenna currents to flow around slot 142 (e.g., as shown by paths 150 and 152 of FIG. 5). Corresponding antenna currents 170 may also be excited on vertical sidewall portion 114, conductive rear housing wall 12R, and conductive layer 160. In another suitable arrangement, if desired, one or more resonant cavity modes associated with cavity 163 defined by conductors 116, 114, 12R, and 160 may additionally or alternatively be excited by feed conductor 119 (e.g., where the cavity modes contribute to antenna resonances within one or more desired frequency bands). Conductive layer 160 may serve to isolate feed 95 and feed conductor 119 from electromagnetic interference from components 183 and may serve to isolate components 183 from radio-frequency signals conveyed over feed 95 and feed conductor 119.

As shown in FIG. 7, feeding antenna 40 using a feed conductor 119 may serve to maximize the amount of conductive material within integral ledge 116 (e.g., because feed conductor 119 is formed using a patch of conductive material in slot 142). This may, for example, allow the slot antenna radiating element for antenna 40 to be formed within integral ledge 116 without significantly compromising the structural integrity of peripheral conductive housing sidewall 12W. Forming antenna 40 using integral ledge 116 and conductive cavity 163 below integral ledge 116 may, for example, allow antenna 40 to be incorporated into inactive region 21 without being blocked by active circuitry in display module 112 (even in scenarios where active area AA extends across substantially all of the lateral area of device 10) and while exhibiting a satisfactory antenna efficiency over an entire frequency band of interest (e.g., a 5 GHz WLAN band between about 5150 MHz and 5850 MHz). Covering the 5 GHz WLAN through cover layer 180 may satisfy regulations on absorbed signals in the 5 GHz band that may not otherwise be satisfied were the slot radiating element to be formed in conductive rear housing wall 12R, for example. Forming multiple antennas such as antenna 40 shown in FIGS. 5-7 at other locations within device 10 (e.g., locations 110-1, 110-2, 110-3, 110-4, 110-5, 110-6, and/or other locations along the periphery of display module 112 as shown in FIG. 4) may further immunize wireless communications circuitry 34 from loading and detuning by external objects, while also allowing greater data rates associated with operation under a MIMO scheme, for example.

The foregoing is merely illustrative and various modifications can be made by those skilled in the art without departing from the scope and spirit of the described embodiments. The foregoing embodiments may be implemented individually or in any combination.

What is claimed is:

1. An electronic device having an interior and an exterior, comprising:
    a housing having a peripheral conductive sidewall with an integral ledge extending towards the interior of the electronic device;
    a display having a display cover layer supported by the integral ledge;
    a slot antenna having a slot element in the integral ledge that is configured to convey radio-frequency signals through the display cover layer;
    a conductive patch within the slot element; and
    a radio-frequency transmission line having a positive feed terminal coupled to the conductive patch and a ground feed terminal coupled to the peripheral conductive sidewall, wherein the conductive patch is configured excite an antenna current on the integral ledge and around the slot element via near-field electromagnetic coupling.

2. The electronic device defined in claim 1, wherein the slot element comprises a first elongated segment having a first width and a second elongated segment extending from an end of the first elongated segment and having a second width that is less than the first width.

3. The electronic device defined in claim 2, wherein the conductive patch is located within the first elongated segment of the slot element.

4. The electronic device defined in claim 1, wherein the slot element comprises an open slot.

5. The electronic device defined in claim 1, wherein the housing further comprises a conductive rear wall and the peripheral conductive sidewall extends from the conductive rear wall to the display cover layer.

6. The electronic device defined in claim 5, further comprising:
    a dielectric support structure interposed between the conductive rear wall and the integral ledge, wherein the integral ledge is mounted to the dielectric support structure; and
    a conductive layer that extends between the integral ledge and the conductive rear wall, wherein the peripheral conductive sidewall, the conductive rear wall, and the conductive layer form a conductive cavity for the slot antenna.

7. The electronic device defined in claim 6, further comprising:
    a magnet mounted within the conductive cavity.

8. The electronic device defined in claim 7, wherein the display comprises a display module having pixel circuitry configured to emit light through the display cover layer, the electronic device further comprising:
    a battery in the housing, wherein the conductive layer is configured to electromagnetically isolate the slot element from the battery and the display module.

9. The electronic device defined in claim 1, wherein the housing comprises an additional peripheral conductive sidewall having an additional integral ledge that extends towards the interior of the electronic device and that supports the display cover layer, the electronic device further comprising:
an additional slot antenna having an additional slot element in the additional integral ledge.

10. The electronic device defined in claim 9, wherein the slot element and the additional slot element are both configured to radiate at a frequency between 5150 MHz and 5850 MHz.

11. The electronic device defined in claim 1, wherein the housing further comprises first, second, and third additional peripheral conductive sidewalls, the first additional peripheral conductive sidewall extends parallel to the peripheral conductive sidewall, the second additional peripheral conductive sidewall extends parallel to the third additional peripheral conductive sidewall between the peripheral conductive sidewall and the first additional peripheral conductive sidewall, the peripheral conductive sidewall and the first additional peripheral conductive sidewall each have a first length, and the second and third additional peripheral conductive sidewalls each have a second length that is less than the first length.

12. An electronic device, comprising:
a display having a display cover layer and a display panel configured to emit light through the display cover layer;
a housing having a conductive wall and peripheral conductive structures that extend around a periphery of the electronic device and from the conductive wall to the display cover layer;
a dielectric substrate interposed between the display cover layer and the conductive wall, wherein first and second portions of the peripheral conductive structures define edges of a slot element in a slot antenna at a surface of the dielectric substrate and the second portion of the peripheral conductive structures is formed on the surface of the dielectric substrate; and
a conductive layer on an additional surface of the dielectric substrate that shorts the second portion of the peripheral conductive structures to the conductive wall.

13. The electronic device defined in claim 12, further comprising:
a conductive feed element on the surface of the dielectric substrate that is located within the slot element; and
a radio-frequency transmission line having a ground conductor coupled to the peripheral conductive structures and a signal conductor coupled to the conductive feed element, wherein the conductive feed element is configured to excite antenna currents on the first and second portions of the peripheral conductive structures via near-field electromagnetic coupling.

14. The electronic device defined in claim 13, wherein the peripheral conductive structures comprise a third portion extending from the first portion of the peripheral conductive structures to the conductive wall, the first portion is interposed between the third portion and the second portion, the second portion is interposed between the first portion and the display panel, and the first and third portions are formed from the same integral piece of metal.

15. The electronic device defined in claim 14, further comprising:
a conductive layer on an additional surface of the dielectric substrate, wherein the conductive layer is coupled between the second portion of the peripheral conductive structures and the conductive housing wall and the conductive feed element is further configured to excite additional antenna currents on the conductive housing wall, the third portion of the peripheral conductive structures, and the conductive layer.

16. An electronic device comprising:
a housing having a conductive rear wall and peripheral conductive housing structures with an integral ledge portion;
a display having a display cover layer mounted to the integral ledge portion and a display module configured to emit light through the display cover layer, wherein the integral ledge portion runs around at least some of a periphery of the display module; and
a cavity-backed antenna having a radiating element that is formed from the integral ledge portion and that is backed by a conductive cavity defined by the conductive rear wall, the peripheral conductive housing structures, a conductive layer coupled between the radiating element and the conductive rear wall, and a conductive patch in the slot, wherein the conductive patch is configured to indirectly feed the cavity backed antenna.

17. The electronic device defined in claim 16, wherein the radiating element comprises a slot having edges defined by the integral ledge portion and the conductive layer.

18. The electronic device defined in claim 17, wherein the cavity-backed antenna comprises an antenna feed having a positive antenna feed terminal coupled to the conductive patch and a ground antenna feed terminal coupled to the peripheral conductive structures, the electronic device further comprising:
transceiver circuitry in the housing; and
a radio-frequency transmission line coupled between the antenna feed and the transceiver circuitry.

* * * * *